United States Patent
Van Gestel

(10) Patent No.: US 6,526,009 B1
(45) Date of Patent: Feb. 25, 2003

(54) RECORDING MEDIUM, AND METHOD OF AND DEVICE FOR RECORDING INFORMATION ON A RECORDING MEDIUM AND READING INFORMATION FROM A RECORDING MEDIUM

(75) Inventor: Wilhelmus Jacobus Van Gestel, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/787,057

(22) PCT Filed: Jul. 12, 2000

(86) PCT No.: PCT/EP00/06620
§ 371 (c)(1),
(2), (4) Date: Mar. 13, 2001

(87) PCT Pub. No.: WO01/06511
PCT Pub. Date: Jan. 25, 2001

(30) Foreign Application Priority Data

Jul. 16, 1999 (EP) .............................................. 99202344

(51) Int. Cl.⁷ ................................................. G11B 5/09

(52) U.S. Cl. ................................. 369/47.14; 369/53.15; 369/53.17

(58) Field of Search ........................... 369/53.15, 53.16, 369/53.17, 53.2, 53.24, 47.14, 30.03, 30.4, 32.01, 33.01, 53.41, 53.42

(56) References Cited

U.S. PATENT DOCUMENTS 5,237,553 A * 8/1993 Fukushima et al. ...... 369/275.3

* cited by examiner

Primary Examiner—Paul W. Huber
(74) Attorney, Agent, or Firm—Michael E. Belk

(57) ABSTRACT

The invention relates to recording of information, in particular a real-time audio and/or video signal, in a recording track of a recording medium divided into blocks. The recording medium contains a defect list of addresses of blocks which are known to be defective. This list is read and during the recording process the defective blocks are skipped. The recording process is performed without any read-after-write check so as to speed up the process. The defect list is updated by noting, during playback, which blocks give rise to reading problems and by including the addresses of these blocks in the defect list on the recording medium.

21 Claims, 3 Drawing Sheets

RECORDING MEDIUM, AND METHOD OF AND DEVICE FOR RECORDING INFORMATION ON A RECORDING MEDIUM AND READING INFORMATION FROM A RECORDING MEDIUM

BACKGROUND OF THE INVENTION

1. Technical Field

The present invention generally relates to a method of recording information on a recording medium having at least one recording track, which recording track is divided into logic blocks which each have an individual logic address. The recording medium may be, for example, a magnetic or optical recording medium. The present invention typically and particularly though not exclusively relates to recording on an optical disc and will therefore be elucidated with reference to this example of use. However, it is emphasized that the invention is also applicable to other fields of use, such as for example tape recording.

2. Related Art

In general, the amount of information to be recorded in a recording session is greater than one block. The information to be recorded, also referred as "file", is then divided into successive data packets having the size of one block, and the successive data packets of a file are recorded in different blocks of the recording medium, which for the sake of simplicity is referred to hereinafter as "recording disc". For a rapid data transfer it is then desirable that the successive data packets are recorded in successive blocks. The recording process can then proceed virtually continuously. Likewise, during the subsequent reading (playback) of the information recorded on the disc the read process can proceed continuously.

In practice, a disc may exhibit defective blocks, i.e. blocks where a faultless recording of information is no longer possible or where any resulting small write errors can no longer be corrected during reading. Such a block is then no longer suited for recording. The only remedy is then to record the data packet that was to be stored in such a defective block in another block.

In a conventional manner the blocks are tested for defects by checking during a write operation whether recording has been effected correctly. Such a check, which is referred to as "read-after-write" check, is in principle carried out on a block-by-block basis, although it is also possible to record a plurality of blocks and subsequently check a plurality of blocks. Basically, a read-after-write test procedure implies that an information packet is stored in a read-after-write memory having the size of one block, which is read out after recording of the block just written, and that the information read from said block is compared with the information packet stored in the read-after-write memory. If these two information packets correspond the conclusion is drawn that recording has been successful and a following information packet may be recorded in a following recording block of the recording track. However, in the case of a difference between the two information packets it is inferred that recording has not been successful and the recording of the relevant information packet is repeated. A new recording attempt, also termed a "retry", may be effected in the same block but if after a given number of retries the recording in this block still fails, this block is considered to be a defective block in which recording is not possible and the recording of the relevant information packet proceeds in another block. In this way it is achieved that the information is recorded in a reliable manner.

A recording method utilizing such a read-after-write test procedure and a possible new recording attempt in order to repair damaged information requires comparatively much time. Such a recording method is therefore less suitable for uses where an information stream with a high data rate is to be recorded. Such a use is, for example, a real-time recording of audio and/or video signals.

SUMMARY OF THE INVENTION

It is an object of the present invention to provide a recording method and recording apparatus which are more suitable for the recording of information streams with a high data rate, particularly real-time recording of audio and/or video signals.

The present invention more particularly aims at providing an apparatus of the aforementioned type which is suitable as a digital audio and/or video recorder.

It is known per se that a recording apparatus is adapted to first examine the quality of the recording blocks in a test cycle prior to the actual recording process. If defective blocks are detected the sequence numbers or addresses of these blocks are stored in a memory and, subsequently, this memory is addressed during the actual recording process and the defective blocks are skipped. However, testing is again effected with the aid of a read-after-write process and, as a result, the test cycle requires much time before the actual recording process can start.

In accordance with a first major aspect of the present invention the recording medium itself contains a list of addresses of defective blocks. This list is present in a file which should never be overwritten. For this purpose this file may be situated in a predetermined portion of a recording track but, alternatively, this file may have a predetermined name and the recording apparatus is adapted to use the file having this name exclusively for the recording of addresses of defective blocks.

In accordance with another major aspect of the present invention the recording apparatus is adapted to read said file prior to a recording session and to store the block addresses specified therein in an auxiliary memory and to read said auxiliary memory during the recording session and to skip the blocks whose addresses appear in this auxiliary memory during recording.

This prevents recording attempts being made for blocks which are already known as defective blocks. Thus, no time is lost with recording attempts which are doomed to fail.

It is known per se that during the read-out of information (playback) errors may occur, in view of which a read apparatus includes an error correction system, and error correction information for use in this error correction system is recorded during the recording of the data packet. Such an error correction system enables comparatively small errors to be corrected. These errors may have occurred during recording and may be present on the recording medium itself, or they may be produced during reading without an error being present on the recording medium. The extent to which such errors can be corrected depends on the error correction system used; since error correction systems are known per se and the present invention can be used in conjunction with known error correction systems, no detailed explanation of an error correction system will be given herein.

In accordance with a further major aspect of the present invention the quality of the data packets read from each block read during the read-out of the information (playback) is monitored. If a given data packet is found to exhibit incorrigible errors or if reading of a block fails completely, but preferably also if the number of corrigible errors appearing in one block is greater than a predetermined acceptance limit, the address of the relevant block is stored in a second auxiliary memory. After completion of the playback session the blocks whose addresses have been stored are tested. During such a test a standard read-after-write operation is carried out for these blocks in the course of the test process.

The test process for each block includes a step in which a restoration attempt is made. This block is then read one more time, the data packet thus read being presented to the error correction system. If the error correction system is capable of actually correcting the error the restored data is recorded in the relevant block instead of the information just read out, after which a standard read-after-write operation is performed for the restored data in order to ascertain whether recording has taken place in a satisfactory manner. Thus, the error is corrected actively, as a result of which less errors occur during a subsequent read-out and the delay in the data transmission owing to the need for error correction is smaller.

However, if the error correction system cannot correct the error in the information read, it is examined whether the error is merely a non-recurrent write error in an otherwise faultless block, or whether the recording block itself is defective. For this purpose, a predetermined data pattern or code word is recorded in the relevant block, after which a standard read-after-write operation is performed for said code word in order to check whether recording has been effected correctly. If this is the case, the block is apparently not defective; during a subsequent read cycle the code word is recognized as a "dummy". Otherwise, the relevant block is definitively marked as being defective, for which purpose the address of this block is recorded in said file on the recording medium. As has been explained hereinbefore this prevents this block from being addressed during a subsequent recording session.

Furthermore, it is also possible to skip the restoration step and to include each block whose address has been noted during playing in the list of defective blocks as a standard procedure. As a result of this, the apparatus will be ready more rapidly at the end of a playback session but, on the other hand, a comparatively large number of blocks is labeled as being detective, which eventually results in an unnecessary reduction of the storage capacity of the recording medium.

BRIEF DESCRIPTION OF THE DRAWINGS

These and other aspects, features and advantages of the present invention will be elucidated further by means of the following description of a preferred embodiment of a recording apparatus and a recording method in accordance with the invention with reference to the drawings, in which identical or similar parts bear the same reference symbols and in which.

DETAILED DESCRIPTION OF THE EMBODIMENTS

Figure 1:
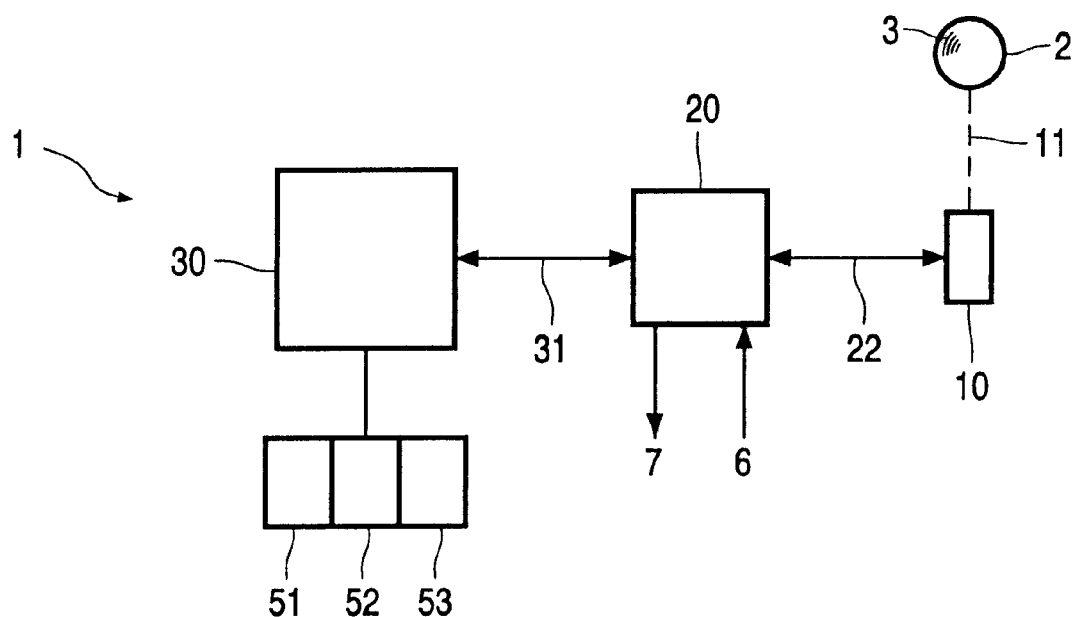
FIG. 1 diagrammatically shows an apparatus adapted to record information on a recording disc and to play back a recording disc.

FIG. 1 diagrammatically shows an write/read apparatus 1 for inscribing and reading a disc-shaped recording medium or recording disc 2. The apparatus has an input 6 for receiving information to be recorded on the disc 2, for example a real-time video and/or audio signal, and an output 7 for supplying a signal read from the disc 2 in a read cycle. Obviously, the input 6 and the output 7 may be combined to form a combined input/output.

The disc 2 may be a magnetic recording disc, for example a hard disc, in which case the write/read apparatus 1 is a magnetic recording/read apparatus. The disc 2 may also be an optical recording medium, for example a Compact Disk-Re-Writable (CD-RW), in which case the write/read apparatus 1 is an optical recording/read apparatus. The invention does not exclusively relate to disc-shaped recording media, but also to, for example, recording tape.

The disc 2 has a multitude of mutually concentric recording tracks 3, which are assumed herein to be individual circular tracks. However, the tracks 3 may alternatively represent one continuous spiral track. As illustrated in FIG. 1, the write/read apparatus 1 has an optical write/read head 10 and a turntable, which is not shown for the sake of simplicity and which faces the head 10, on which turntable the disc 2 can be positioned and by means of which the disc 2 can be given a rotational movement with respect to the head 10, thus enabling a track 3 to be scanned by the head 10. The write/read apparatus 1 further includes means, which are known per se and which are not shown for the sake of simplicity, for moving the head 10 in a radial direction of the disc 2, thus enabling different tracks 3 of the disc 2 to be accessed by the head 10. As is well-known, information is written in the track 3 by means of a laser beam 11 from the head 10 in the case of optical recording.

The write process, as well as the read process, is controlled by a functional unit 20, referred to hereinafter as the write/read control unit. Such a write/read control unit 20 is known per se and is therefore not described further. The write/read control unit 20 is adapted to control the positioning of the head 10 with respect to the disc 2 in such a manner that the write process or the read process takes place at a desired location on the disc 2 through control of said turntable for the disc 2 and said positioning means for the write head 10. Furthermore, the write/read control unit 20 controls the intensity of the laser beam 11 in dependence on the input signal S to be recorded. This intensity control function of the write/read control unit 20 is represented diagrammatically as the coupling 22 in FIG. 1.

The write/read apparatus 1 further has a functional unit 30, hereinafter termed the allocation manager. A typical allocation manager 30 is known per se and is therefore not described further. The allocation manager 30 is adapted to determine on which part of the disc 2 a certain recording session or recording is to take place. When a user starts a recording the allocation manager 30 determines whether there is enough space for the recording on the relevant disc 2, and if such space is available, where this space is located. The allocation manager 30 informs the write control unit 20 of the starting location of this available space, which communication is represented diagrammatically as the signal coupling 31.

Since magnetic and optical recording are processes which are known per se and possible constructions for a magnetic recording medium 10 or an optical recording medium 10 are known per se, while moreover magnetic and optical write/read apparatuses 1 are known per se, they will not be described here in any further detail.

Figure 2:
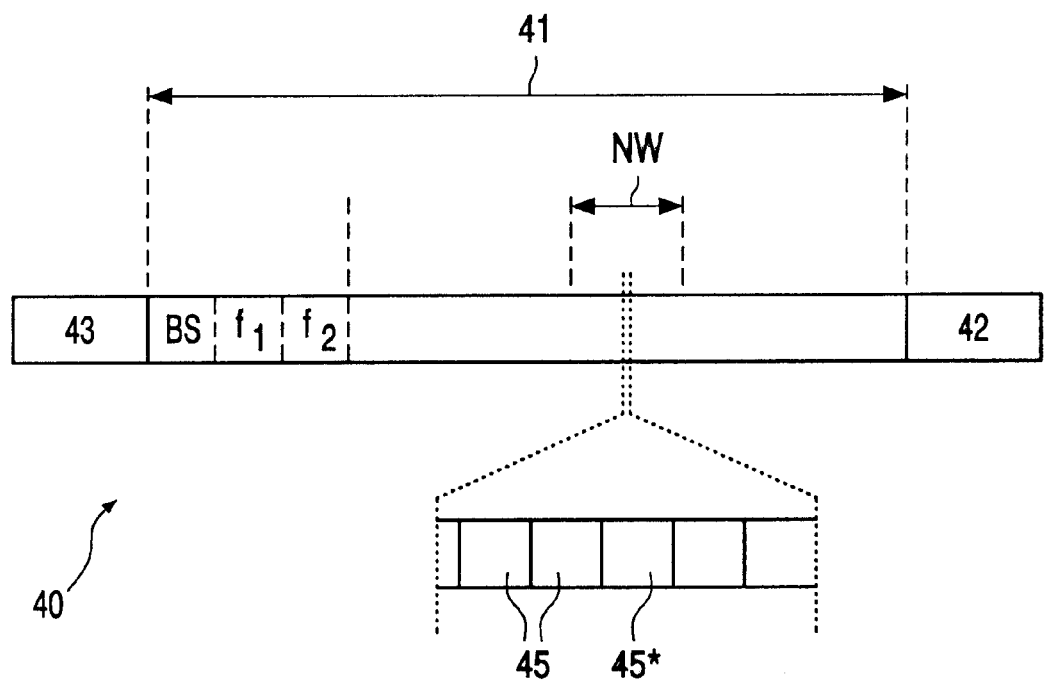
FIG. 2 diagrammatically shows the logic structure of a recording medium.

FIG. 2 diagrammatically represents the logic structure of the disc 2. The recording tracks 3 together define a recording area 40 of the disc 2, which is shown as a continuous strip in FIG. 2, and which will also be referred to hereinafter as the recording area.

The recording area 40 of the disc 2 has been divided into logic blocks 45, which each have an individual predetermined address. The reference symbol 45* refers to a defective block. The value of the relevant address of a block 45 has been recorded in a predetermined address field of the block 45. It is thus possible to record information directly at a given location which corresponds to a given address on the disc 2 and it is likewise possible to read the information directly from a given location which corresponds to a given address. The blocks 45 have a block size which need not be equal for all the blocks. The amount of data that can be written in one block is termed a data packet.

The recording area 40 consists for a substantial part of a so-called addressable space or user area 41, which can be accessed by a user in order to record information and will therefore also be referred to hereinafter as the user area. The information in the user area 41 is arranged in logic files f1, f2 etc., each file corresponding to a recording session. Each logic file f1, f2 etc., may involve a large number of blocks 45, the successive data packets in a logic file f1, f2 etc., generally corresponding to successive blocks 45 of the user area 41.

The recording area 40 further includes an area 43 reserved for administrative information relating to the disc 2 and the information recorded on this disc. This area 43 will also be referred to hereinafter as the administrative area 43. The administrative area 43 inter alia includes a table of contents relating to the files recorded on the disc 2, which table specifies the start address, the length, the name, etc., of each file. Normally, the name of each file may be chosen freely by the user. However, in accordance with an aspect of the present invention, the disc 2 has at least one file in the user area 41 to which the user has no access and which has a pre-defined standard name, the standard name chosen in the present case being "BS". The file BS has a non-critical physical location in the user area 41; in FIG. 2 the file BS is shown at the beginning of the user area 41, but this location is not necessary. It is relevant only that the location of the file BS is known and that this file BS is protected against erasing and overwriting by a user.

The recording area 40 of the disc 2 may optionally further include a spare area 42 reserved for replacement recording. In accordance with a further aspect of the present invention the file BS contains a list of addresses of blocks in the user area 41 which are known to be defective. This list is also referred to as the defect list. The defect list may be implemented in the form of an initially empty memory in which only the sequence numbers or addresses of defects are stored. It is also possible to implement the defect list in the form of a memory having a predetermined number of storage locations, each storage location corresponding to the sequence number of one specific recording track, with the content of this storage location being indicative of whether the relevant recording track is either defective or not defective; each of the storage locations need then comprise only one bit.

Furthermore, in accordance with an aspect of the present invention, the write/read apparatus 1 is adapted to detect, prior to the recording of information on the disc, whether the disc 2 has a file named BS and, if this is the case, to revert to the content of this file BS in order to find out the addresses of defective blocks and to skip these defective blocks during the subsequent write process.

Figure 3:
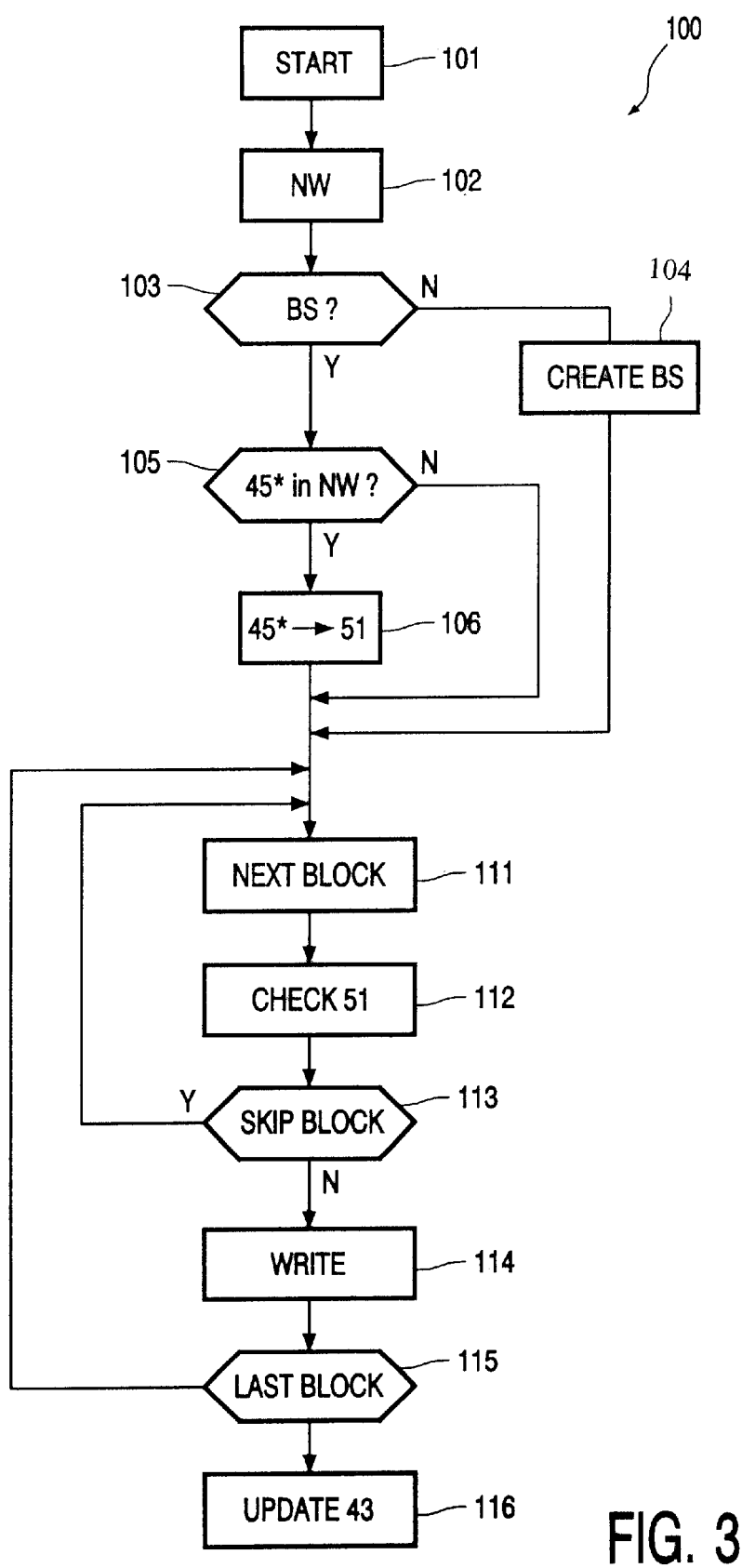
FIG. 3 is a flow chart of a write or recording method in accordance with the present invention.

The operation of a write/read apparatus 1 in accordance with the invention will be described in more detail with reference to the flow charts of FIGS. 3 and 4, and also with continued reference to FIGS. 1 and 2.

In step 101 of a recording cycle 100 the write/read apparatus 1 receives a recording command from the user. The allocation manager 30 is adapted to then determine in step 102 which part of the user area 41 of the recording area 40 of the disc 2 has already been used for previous recordings and defines an area NW where recording can be effected in the non-used portion of the user area 41.

The allocation manager 30 is adapted to address the administrative area 43 of the recording area 40 of the disc 2 in step 103 and to determine whether the disc 2 contains a file named "BS". The allocation manager 30 is adapted to create a file BS in step 104 if it appears in step 103 that the disc 2 does not yet contain a file BS. If in step 103 it is found that there is a file BS, the allocation manager 30 refers to the defect list of the file BS in step 105 to determine which blocks in the area NW, defined for recording, are known to be defective. In step 106, the allocation manager 30 stores the addresses of the defective blocks 45*, found in the area NW, in first auxiliary memory 51.

For the purpose of illustration, it is assumed that this is the first time that a recording is going to be made in area NW. This means that there is not yet any information available about the blocks 45, in this area, NW being defective or not. Consequently, no block addresses are now stored in first auxiliary memory 51.

After these preliminary steps, which require a comparatively short time, the actual recording process is started. In step 111 the allocation manager 30 determines the next block address (n.b., at the start: the first block address) in the area NW defined for recording. In step 112, the allocation manager 30 checks whether this block address appears in the first auxiliary memory 51. If this is the case, the relevant block is known to be defective and in step 113 a decision is made to skip this block, and the allocation manager 30 returns to step 111. In the other case, a new data packet of the signal or information stream received at the input 6 is written into the relevant block 45 in step 114. If the recording has not yet been completed in step 115, the allocation manager 30 returns to step 111.

If area NW does contain a defective block 45*, this information is not known before the start of the recording process and, consequently, the block address of is defective block 45* has not yet been stored in the first auxiliary memory 51, so a data packet will be written to defective block 45*. Thus, in accordance with an aspect of the present invention a data packet is written into all the available blocks of the area NW defined for recording, and no read-after-write check is carried out during the recording process. As a result, the actual recording process is comparatively fast, which is an advantage of the present invention.

Upon termination of the recording, the allocation manager 30, in step 116, updates the information in the administrative area 43 in a customary manner and, specifically, records the start address and the length and/or the end address of the new recording and a name for this recording.

When a user wishes to play back the recording, in step 201 the apparatus 1 receives the appropriate playback command from the user, for which purpose the user enters, for example, a sequence number or the name of a selected recording. In step 202 the allocation manager 30 makes reference to the administrative area 43 to obtain the first block address of the selected recording, and in step 203 the allocation manager 30 instructs the write/read unit 20 to read the user area 41 of the disc 2 starting at this first block address, and to transfer the information being read to the output 7 for further processing by, for example, an audio or video reproducing system.

In step 204 the write/read unit 20 reads the data in the relevant block and determines the quality of the data, which is effected in known manner with the aid of an error correction algorithm. Since such error correction algorithms are known per se, it is not necessary to describe an example of such an error correction algorithm.

If in step 204 the block being read is found to exhibit no errors or only a small number of errors which all appear to be corrigible, the write/read unit 20 proceeds to step 205 in order to output the information read via output 7. If the end of the recording has not yet been reached the write/read unit 20, in step 206, returns to step 204 to read a following block.

If in step 204 the block being read is found to exhibit errors which are all corrigible but which appear in such a number that a predetermined limit is exceeded, the write/read unit 20 transfers the relevant block address to the allocation manager 30 in step 211, upon which the allocation manager 30 stores the relevant block address in a second auxiliary memory 52 in step 212, which second auxiliary memory 52 is also referred to as the "problem memory". Subsequently, the write/read unit 20 proceeds to step 205 in order to output the information read via, output 7.

If in step 204 the block to be read appears to be unreadable or to contain at least one incorrigible error or a skip code (whose meaning will be explained hereinafter), the write/read unit 20 transfers the relevant block address to allocation manager 30 in step 221, upon which allocation manager 30 stores the relevant block address in the problem memory 52 in step 222. The write/read unit 20 may now proceed directly to step 206 and thus skip step 205, as shown in FIG. 4, in order to inhibit an information output via output 7. However, it is also possible that the damaged information or the dummy information of the skip code may be fed out normally via output 7, optionally provided with a warning bit as a sign that the information in this block is unreliable. In this case, the write/read unit 20 proceeds to step 205 after step 222; in fact, individual steps 221, 222 may be dispensed with.

If in step 206 it appears that all the blocks of the requested recording have been read, the playback cycle 200 is terminated.

Figure 4:
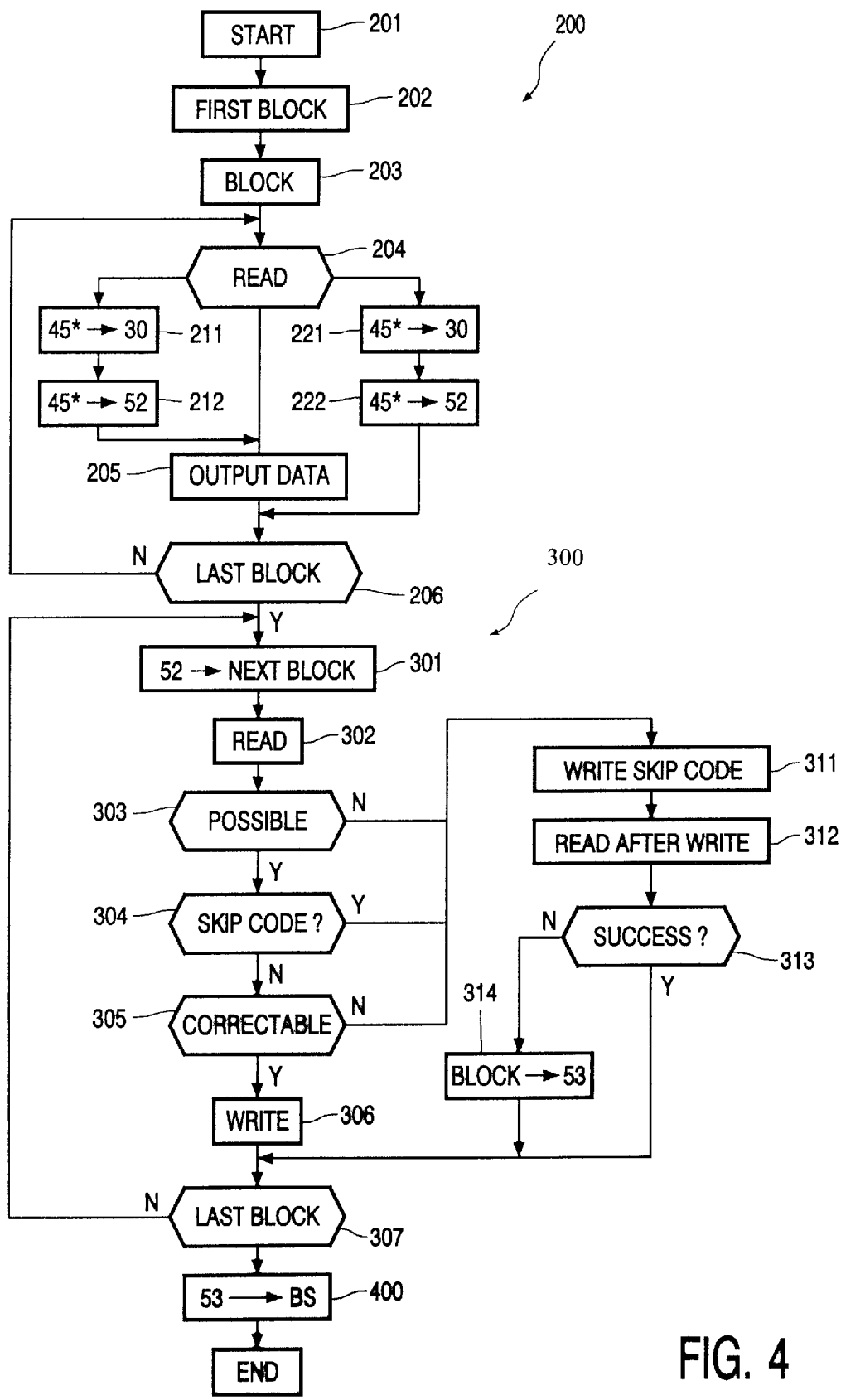
FIG. 4 is a flow chart of a read or playback method in accordance with the present invention.

As illustrated in FIG. 4, the allocation manager 30 now proceeds to a restoration cycle 300 in order to attempt to improve the quality of the blocks defined in the problem memory. In step 301 the allocation manager 30 reads from said problem memory 52 the next block address (n.b., at the start: the first block address) of block 45 where problems have been encountered during playback. In step 302 the allocation manager 30 reads the data from said block 45. In step 303 the allocation manager 30 checks whether reading is possible. If reading appears to be possible, allocation manager 30 checks in step 304 whether the relevant block contains a skip code. If this appears not to be the case, allocation manager 30 checks in step 305, with the aid of all error correction algorithm, whether the block exhibits only corrigible errors. If this is the case, the corrected information is written into the relevant block in a restoration step 306, and it is checked by means of a read-after-write operation whether the restored data has been recorded successfully.

Subsequently, allocation manager 30 reads the problem memory 52 in step 307 to determine whether problem memory 52 contains more addresses of problem blocks. If this is the case, allocation manager 30 proceeds with the step 301.

If in step 303 it appears that reading of the relevant block is not possible, or if in step 304 it appears that the relevant block contains a skip code, or if in step 305 it appears that the relevant block contains at least one incorrigible error, then a test is carried out to check whether the relevant block is defective. For this purpose, the allocation manager 30 writes a predetermined data pattern or code word, referred to as a "skip code", into the relevant block in step 311, as a result of which this block can be identified as defective or as a dummy in a subsequent read session. In step 312, the allocation manager 30 checks, by means of a read-after-write operation, whether the skip code has been recorded successfully. If in step 313 the skip code appears to be recorded correctly the conclusion is drawn that the relevant block is not defective and the allocation manager 30 proceeds to step 307. Otherwise, the conclusion is drawn that the relevant block should be labelled definitively as a defective block 45*, for which purpose the allocation manager 30, in step 314, stores the address of this block into a third auxiliary memory 53, which is referred to hereinafter as the "erase memory". After this, the allocation manager 30 proceeds with step 307.

If in step 307 it appears that all the blocks whose addresses have been stored in the problem memory 52 have been processed in the restoration cycle 300, the restoration cycle is terminated. The allocation manager 30 then proceeds to erase step 400, in which the allocation manager 30 writes the addresses from the erase memory 53 into the file BS on the disc 2. If the disc 2 is a disc which does not yet contain a file BS, such a file is created first.

In this way, some blocks of the recording thus read (may) have been restored. During a subsequent read-out step a smaller number of read errors may be expected. However, the recording may still contain defective blocks. During a subsequent read-out these blocks will be recognized and no attempt will be made to subject these blocks to an error correction algorithm, as a result of which loss of time is avoided.

When the user no longer wishes to keep the relevant recording he will release the part of user area 41 occupied by this recording for a subsequent recording. During a subsequent recording session the user is then no longer confronted with these defective blocks in this area because in step 105 the allocation manager 30 will recognize the defective blocks and will skip these blocks in step 113.

Thus, the invention provides a very effective method of recording information, particularly real-time audio and/or video information, in a recording track 3 divided into blocks 45 on a recording medium 2. The recording medium contains or is provided with a defect list BS with addresses of blocks 45* which are known to be defective. This list is read and the defective blocks are skipped during the recording process, which is carried out without a read-after-write check in order to increase the speed. The defect list is updated by noting which blocks give rise to read problems during reading of a file and by recording the addresses of these blocks in this defect list on the recording medium after reading.

It will be evident to one skilled in the art that the scope of the present invention is not limited to the examples described hereinbefore but that that various changes and modifications thereto are possible without departing from the scope of the invention as defined in the appended Claims.

Thus, it is possible for example to carry out steps 311–313 in a separate cycle prior to the erase step 400.

It is likewise possible to simplify and thereby speed up the restoration cycle 300, in that, in step 212 of the playback cycle 200 a block address of a block which contains only corrigible errors is stored in the problem memory 52 and in that in step 222 of the playback cycle 200 a block address of a block which has been found to exhibit more serious errors is stored in a further auxiliary memory. In such a simplified restoration cycle 300, step 306 is carried out for the block addresses specified in the problem memory 52 and steps 311–314 are carried out for the block addresses specified in said further auxiliary memory.

If desired, the restoration cycle 300 may be dispensed with completely, in which case the problem memory 52 is consulted in erase step 400, instead of the erase memory 53, which may be dispensed with in this variant.

Embodiments of the present invention have been disclosed. A person of ordinary skill in the art would realize, however, that certain modifications would come within the teachings of this invention. Therefore, the following claims should be studied to determine the true scope and content of the invention.

I claim:

1. A recording medium comprising:
   at least one recording track; and
   a recording area in said recording track, wherein said recording area is divided into logic blocks, each logic block having a predetermined individual logic address, and wherein a defect list of logic addresses of defective blocks is stored within the logic blocks, such that the defect list is stored at at least one of said predetermined individual logic addresses.

2. A recording medium as claimed in claim 1, wherein said defect list is protected against at least one of overwriting and erasing by a user.

3. A recording medium as claimed in claim 2, wherein for the purpose of said protection said defect list has a predetermined standard name.

4. A recording medium as claimed in claim 3, wherein for the purpose of said protection said defect list is recorded at a predetermined location.

5. A method of recording information on a recording medium comprising:
   providing at least one recording track;
   providing a recording area in said recording track, said recording area divided into logic blocks, said logic blocks each having a predetermined individual logic address;
   recording information in said recording area;
   determining, prior to recording information, whether the recording medium has a file having a predetermined name, wherein said file contains a defect list of addresses of defective blocks, said file located within one of said logic blocks having a predetermined individual logic address; and
   creating said file, if the recording medium does not yet have said file.

6. A method of recording information on a recording medium comprising:
   providing at least one recording track, said recording track having a recording area, said recording area divided into logic blocks which each have a predetermined individual logic address;
   determining, prior to recording information, whether the recording medium has a file located within said logic blocks and having a predetermined name, wherein said file contains a defect list of addresses of defective blocks;
   reading, if the recording medium has such a file, the addresses of defective blocks specified in said file; and
   skipping said addresses of defective blocks when recording information.

7. A method of reading information from a recording medium comprising:
   providing at least one recording track;
   providing a recording area in said recording track, said recording area divided into logic blocks, said logic blocks each having a predetermined individual logic address;
   reading information from at least one of said logic blocks;
   monitoring whether a problem occurs during the step of reading information from said logic blocks, and when a problem occurs, noting each defective logic block wherein a problem occurs;
   storing the address of each defective logic block, in which a problem occurs, in a problem memory; and
   recording, upon termination of the reading information step, the addresses of the defective logic blocks stored in the problem memory in a defect list in a predetermined file on the recording medium.

8. The method of claim 7, wherein said problem is selected from the group consisting of: reading of a block fails completely and a block appears to contain incorrigible errors during reading if the number of corrigible errors occurring in one block is greater than a predetermined acceptance limit.

9. A method of reading information from a recording medium comprising:
   providing at least one recording track;
   providing a recording area in said recording track, said recording area divided into logic blocks which each have a predetermined individual logic address;
   reading information from at least one of said logic blocks;
   monitoring whether a problem occurs during the step of reading information from said logic blocks, and when a problem occurs, noting each defective logic block wherein a problem occurs;
   storing the address of the defective logic block, in which a problem occurs, in a problem memory; and
   checking, upon termination of the reading information step, the defective logic blocks specified in the problem memory.

10. A The method of claim 9, wherein said problem is selected from the group consisting of: reading of a block fails completely and a block appears to contain incorrigible errors during reading if the number of corrigible errors occurring in one block is greater than a predetermined acceptance limit.

11. A method as claimed in claim 9, wherein said step of checking further comprises:
    reading information from said defective logic block;
    subjecting said information to an error correction algorithm; and
    writing, if the information thus read appears to be restorable information, the restorable information into the defective logic block in a restoration step.

12. The method of claim 11, further comprising, following the step of writing the restorable information, the step of:
    performing a read-after-write check on the restorable information.

13. A method as claimed in claim 9, wherein the step of checking a defective logic block specified in the problem memory further includes:

reading the information in said block;
subjecting said information to an error correction algorithm;
writing, if the information appears to be non-restorable, a predetermined code word into the defective logic block;
performing a read-after-write check; and
recording, if during said read-after-write check it appears that said code word has not been written successfully, the address of the defective logic block in a defect list in a predetermined file on the recording medium.

14. A method as claimed in claim 13, wherein said predetermined code is a skip code.

15. A method of recording information, particularly a real-time audio and/or video signal in a recording track of a recording medium, said method comprising:

dividing said recording track into logic blocks, wherein each of said logic blocks has a predetermined logic address;
providing at least one of the recording medium containing a defect list of addresses of logic blocks which are known to be defective, and the recording medium is provided with such a defect list;
reading said defect list;
skipping, during the recording process, which is carried out without a read-after-write check so as to speed up the process, the blocks whose addresses have been read from said defect list; and
updating said defect list by noting which of said blocks give rise to read problems during reading of a file and by recording the addresses of these blocks in said defect list on the recording medium after reading.

16. An apparatus for at least one of a write process and a read process, particularly suited for at least one of a real-time audio and video signal, in a recording track of a recording medium, which recording track has been divided into blocks, wherein each of said blocks has a predetermined logic address, said apparatus comprising:

a write/read unit adapted to control the write process and the read process;
an allocation manager coupled to said write/read unit;
a first auxiliary memory associated with the allocation manager;
wherein the allocation manager is adapted to read, after having received a recording command and having defined a part intended for recording in the recording area of the recording medium, a file recorded on the recording medium and containing a defect list of addresses of defective blocks and to store the block addresses specified in the defect list in the first auxiliary memory; and wherein the allocation manager is adapted to examine, each time that a new block is reached during the recording process, whether the block address of said new block appears in the first auxiliary memory, and to skip said new block if the block address of said new block actually appears in the first auxiliary memory.

17. An apparatus as claimed in claim 16, wherein the allocation manager is adapted to not allow a user to use a predetermined name reserved for the defect list, and wherein the allocation manager is adapted to not allow a user to at least one of erase and overwrite the first file having said predetermined name reserved for the defect list.

18. An apparatus as claimed in claim 16, further comprising a problem memory associated with the allocation manager;

wherein the write/read unit is adapted to monitor, using a first error correction algorithm, the quality of the data being read during a read cycle, each time that the data is read from a given block and, if given problems occur, to transfer the address of the block containing the problems to the allocation manager; and
wherein the allocation manager is adapted to store the block address thus received from the write/read unit in the problem memory.

19. An apparatus as claimed in claim 18, wherein the allocation manager is adapted to read, after termination of the read cycle, the data of a block whose address is stored in the problem memory, and to subject said data to a second error correction algorithm, and if the data thus read appears to be restorable, to write the restored data into the block, and after this, to carry out a read-after-write check.

20. An apparatus for at least one of a write process and a read process, particularly suited for at least one of a real-time audio and video signal, in a recording track of a recording medium, wherein said recording track has been divided into blocks, wherein each of said blocks has a predetermined logic address, said apparatus comprising:

a write/read unit adapted to control the write process and the read process;
an allocation manager coupled to said write/read unit;
a first auxiliary memory associated with the allocation manager, wherein the allocation manager is adapted to:
read, after having received a recording command and having defined a part intended for recording in a recording area of the recording medium, a defect file, recorded on the recording medium, said defect file containing a defect list of addresses of defective blocks; and
store the block addresses specified in the defect list in the first auxiliary memory, wherein said allocation manager is adapted to examine, each time that a defective block is reached during the recording process, whether the block address of said defective block appears in the first auxiliary memory, and to skip said defective block if the block address of said defective block appears in the first auxiliary memory;
a problem memory associated with the allocation manager, wherein the write/read unit is adapted to monitor, using a first error correction algorithm, the quality of the data being read during a read cycle, each time the data is read from a block, and, if a problem occurs, to transfer the address of the defective block containing the problem to the allocation manager, and wherein the allocation manager is adapted to store the block address thus received from the write/read unit in the problem memory; and
an erase memory associated with the allocation manager, wherein the allocation manager is adapted to read, after termination of the read cycle, the data of a defective block whose address is stored in the problem memory and to subject said data to a second error correction algorithm and, if the data thus read appears to be non-restorable, to write a predetermined code word into the defective block and, after this, to carry out a read-after-write check, wherein the allocation manager is adapted to store the block address of the defective block in said erase memory if during said read-after-write check it appears that said code word has not been written successfully, and wherein the allocation manager is adapted to record the block addresses stored in the erase memory in a defect list in a predetermined file on the recording medium after all the defective blocks whose addresses are stored in the problem memory have thus been checked.

21. An apparatus as claimed in claim 20, wherein said predetermined code is a skip code.

* * * * *